UNITED STATES PATENT OFFICE.

MEINHARD HOFFMANN, OF FRANKFORT-ON-THE-MAIN, GERMANY, ASSIGNOR TO LEOPOLD CASSELLA & CO., OF SAME PLACE.

DIAZO DYE.

SPECIFICATION forming part of Letters Patent No. 480,326, dated August 9, 1892.

Application filed December 12, 1891. Serial No. 414,836. (Specimens.) Patented in France September 11, 1891, No. 201,770.

*To all whom it may concern:*

Be it known that I, MEINHARD HOFFMANN, doctor of philosophy, a citizen of the Empire of Germany, and a resident of Frankfort-on-the-Main, Germany, have invented certain new and useful Improvements in Bluish-Black ʻloring-Matters, (for which I have received a ıt in France, No. 201,770, dated Septem- :, 1891,) of which the following is a speci- ııon.

This invention (for which the Manufacture ʻonnaise de Matières Colorantes, in Lyons, ʻeceived, in France, on May 15, 1891, an ional certificate to its Patent No. 201,770) ıes to the production of new diazo color- ıng-matters, which is derived from the amidonaphtholdisulpho-acid H, which is described in Patent No. 464,135, dated December 1, 1891. This acid has probably the constitution:

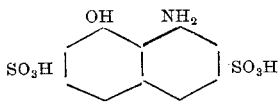

and can be prepared in the most practical way by heating the diamidonaphthalinealphadisulpho-acid with mineral acids. If the acid H is combined with one equivalent of a diazo compound in a solution containing a free mineral acid, products are obtained which show the property of reacting with a second equivalent of diazo compounds in alkaline solution, forming bodies of the general formula:

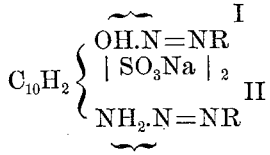

This new and interesting fact is the scientific base of my process, which is illustrated by the following example: 13.8 kilograms of paranitraniline are diazotized in presence of a sufficient quantity of muriatic acid and a neutral solution of thirty-two kilograms of amidonaphtholdisulpho-acid H is added to the solution of the diazo body. Attention is to be paid to the fact that a certain quantity of mineral acid always remains in a free state. A reddish solution results, from which the coloring-matter partially separates. By addition of an excess of carbonate of soda all is dissolved with a blue shade. Then the diazo derivative of 9.3 kilograms analine is introduced into the solution, which is to be kept alkaline. The coloring-matter will be immediately formed and partially separates from the solution. It is entirely precipitated by addition of common salt and filtered off. It dyes animal fiber a greenish blue-black of great intensity and fastness. The latter can be increased by the application of chrome mordants. Analogous results are obtained if the acid H is first combined with one equivalent of the diazo derivatives of analine, metanitraniline, nitro-toluidine.

For the second combination, instead of analine, the diazo derivatives of toluidine, nitraniline, nitro-toluidine, naphthylamine, or sulpho-acids of these substances may be used. All the resulting coloring-matters dye animal fiber a deep greenish or blueish black.

Having now described the nature of my invention and in what manner the same may be performed, I claim as new and desire to secure by Letters Patent—

1. The new process of producing diazo coloring-matters from the amidonaphtholdisulpho-acid H, which consists of the following steps: One molecule of the acid H is introduced into the solution of one molecule of a diazo body in presence of a mineral acid; the solution is made alkaline and a second molecule of a diazo body is added; the separation of the dye-stuff is completed by means of common salt, all substantially as herein described.

2. The new coloring-matter hereinbefore described, composed of two molecules of diazo bodies, such as diazo nitro-benzole, diazobenzole, and one molecule of amidonaphtholdisulpho-acid H, forming a greenish-black powder, easily soluble in water, with a blue color, more difficultly soluble in spirit, dissolving in concentrated sulphuric acid with a dark-green shade; on addition of water the color of this solution is changed into blue and a dark-blue precipitate is formed.

In testimony that I claim the foregoing as my invention I have signed my name, in presence of two witnesses, this 25th day of November, 1891.

MEINHARD HOFFMANN.

Witnesses:
 ALVESTO S. HOGUE,
 JEAN GRUND.

It is hereby certified that in Letters Patent No. 480,326, granted August 9, 1892, upon the application of Meinhard Hoffmann, of Frankfort-on-the-Main, Germany, the title of the invention was erroneously printed at the head of the specification "Diazo Dye," whereas the said title should have been printed *Disazo Dye;* and that in lines 15 and 78, of the printed specification, the word "diazo" should read *disazo;* in line 16, the word "is" should read *are;* and in lines 55, 66, and 68–9 the word "analine" should read *aniline;* and that the said Letters Patent should be read with these corrections therein that the same may conform to the record of the case in the Patent Office.

Signed, countersigned, and sealed this 16th day of August, A. D. 1892.

[SEAL.]                                              CYRUS BUSSEY,
*Assistant Secretary of the Interior.*

Countersigned:
    N. L. FROTHINGHAM,
        *Acting Commissioner of Patents.*